United States Patent [19]

Scherenberg

[11] Patent Number: 5,152,272
[45] Date of Patent: Oct. 6, 1992

[54] CYLINDER HEAD WITH AN EVAPORATION ELEMENT IN AN AIR-INTAKE CHANNEL

[75] Inventor: Dieter Scherenberg, Stuttgart, Fed. Rep. of Germany

[73] Assignee: Mercedes-Benz AG, Fed. Rep. of Germany

[21] Appl. No.: 721,244

[22] Filed: Jun. 26, 1991

[30] Foreign Application Priority Data

Jun. 26, 1990 [DE] Fed. Rep. of Germany ....... 4020267

[51] Int. Cl.[5] ............................................ F02M 31/00
[52] U.S. Cl. .................................. 123/547; 123/543; 123/549; 123/557
[58] Field of Search ............... 123/543, 545, 547, 549, 123/559, 557, 445, 472

[56] References Cited

U.S. PATENT DOCUMENTS

| | | | |
|---|---|---|---|
| 3,145,699 | 8/1964 | High | 123/445 |
| 3,930,477 | 8/1973 | Jordan. | |
| 4,211,191 | 7/1980 | Kawamura et al. | 123/445 |
| 4,378,001 | 3/1983 | Takeda et al. | 123/445 |

FOREIGN PATENT DOCUMENTS

| | | |
|---|---|---|
| 0343652 | 11/1989 | European Pat. Off.. |
| 81224 | 4/1893 | Fed. Rep. of Germany. |
| 3426469 | 5/1986 | Fed. Rep. of Germany. |
| 2567965 | 1/1985 | France. |
| 0052238 | 4/1979 | Japan ................................. 123/543 |
| 56-129748 | 10/1981 | Japan. |
| 0131822 | 8/1982 | Japan ................................. 123/557 |
| 0007765 | 1/1984 | Japan ................................. 123/557 |
| 0219446 | 11/1985 | Japan ................................. 123/547 |
| 337962 | 11/1930 | United Kingdom. |

Primary Examiner—Andrew M. Dolinar
Assistant Examiner—M. Macy
Attorney, Agent, or Firm—Evenson, Wands, Edwards, Lenahan & McKeown

[57] ABSTRACT

A cylinder head of an internal-combustion enbgine with at least one inlet valve and a fuel injection in an air-intake channel has an evaporation element intended for improving the fuel/air mixture formation projecting into the air-intake channel. The evaporation element has high thermal conductivity in a partition wall between the inlet-valve channels in multi-valve engines and makes direct thermal contact between the air-intake channel and the main combustion space. The heating of the mixture mass located in the air-intake channel is thus self-regulated by the combustion heat in the main combustion space. The installation avoids the hitherto necessary resistance heating constituting a drain on the power supply and improves the heating regulation of the mixture mass.

6 Claims, 2 Drawing Sheets

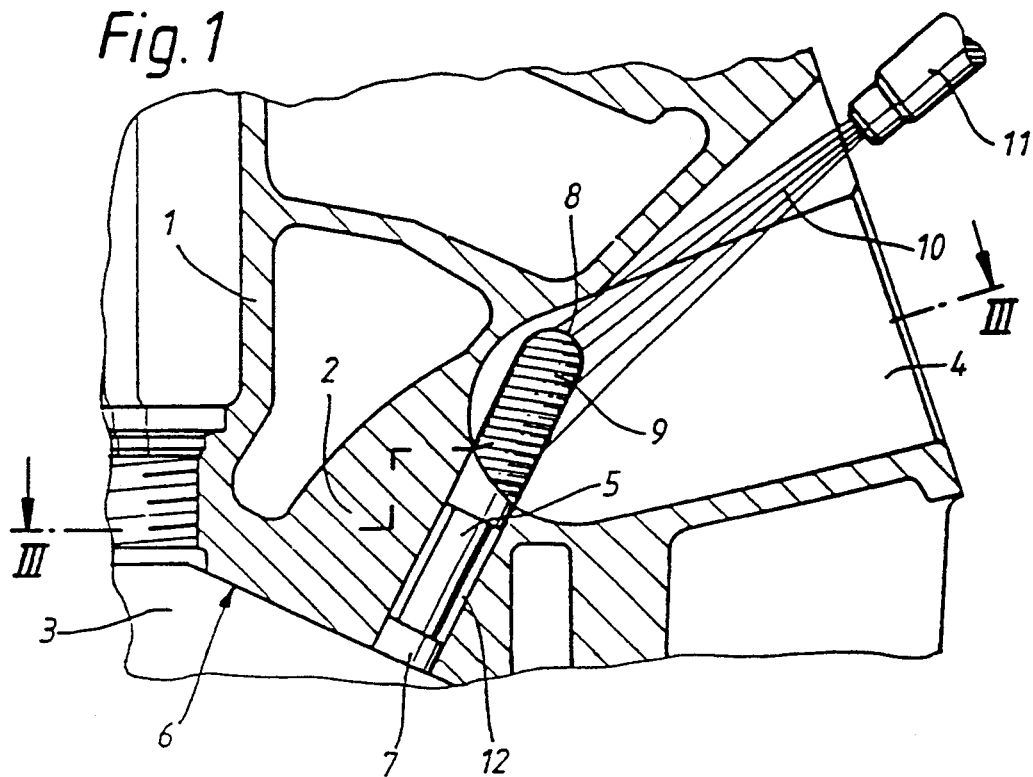
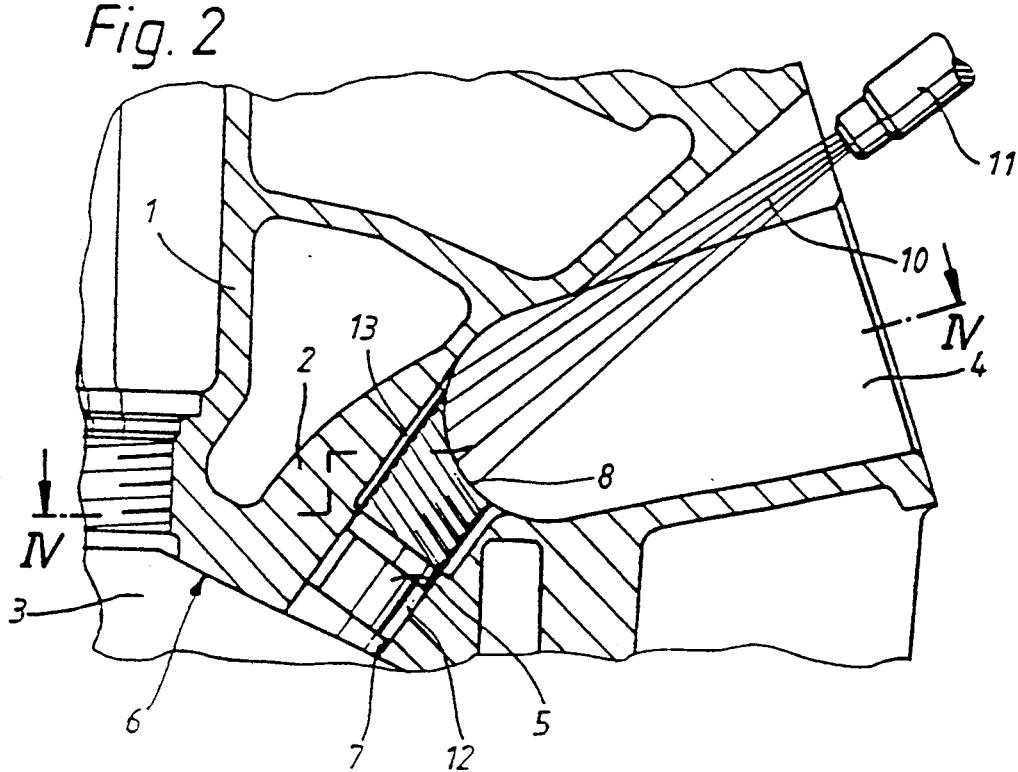

CYLINDER HEAD WITH AN EVAPORATION ELEMENT IN AN AIR-INTAKE CHANNEL

BACKGROUND AND SUMMARY OF THE INVENTION

The present invention relates to a cylinder head of an internal-combustion engine with at least one inlet valve and a fuel injection in an air-intake channel and with an evaporation element intended for improving the fuel-/air mixture formation and projecting into the air-intake channel.

A cylinder head with an evaporation in the air-intake channel is described in U.S. Pat. No. 3,760,780. A resistance heating device is arranged on the evaporation element to improve the mixture formation. This resistance heater is equipped with a control for keeping the temperature of the element constant. In the higher load and speed ranges, however, the mixture mass flow also increases, with the result being that the evaporation element kept at a constant temperature can no longer heat the mixture mass sufficiently.

An object of the present invention is, therefore, while doing away with the resistance heating, to provide an evaporation element which heats the mixture mass as a function of the mixture mass flow, with more or less heating power being supplied respectively with an increasing or decreasing mixture mass flow.

This object has been achieved in accordance with the present invention by configuring the evaporation element to adjoin one end of a main engine combustion space and be made of a high thermal conductivity material.

Thus, in multi-valve engines, a cylinder constituted of high thermal conductivity material is fitted as an evaporation element in a partition wall between the inlet channels. The cylinder projects with one end into the main combustion space and with the other end into the air-intake channel. The evaporation element conducts some of the heat occurring during combustion in the main combustion space directly into the air-intake channel, and this is utilized for heating the mixture mass.

With the use of the evaporation element according to the invention, a self-regulating effect on the surface temperature of the heating element and on the mixture mass temperature is achieved, since, for example when there is an increasing mass flow because of the greater combustion heat associated therewith, an increasing transmission of heat into the air-intake channel takes place. Furthermore, a resistance heating with temperature control of previous versions of an evaporation element is avoided and the power supply of the motor vehicle is relieved.

According to another feature of the present invention, the evaporation element additionally possesses, within the partition wall, an annular clearance which largely prevents direct contact of the element with the partition wall and which therefore reduces heat-transmission losses.

A surface enlargement via a ribbed configuration of the end projecting into the air-intake channel further improves the heat emission of the evaporation element.

In an especially streamlined embodiment of the present invention, the end of the evaporation element projecting into the air-intake channel is made oval in cross-section.

By the formation of an air-insulating gap between the ribbed end of the evaporation element terminating flush with the contour of the partition wall and the surrounding partition wall, the fraction of combustion heat transferred from the evaporation element to the surrounding partition wall is reduced and the heating power is consequently increased.

BRIEF DESCRIPTION OF THE DRAWINGS

These and other objects, features and advantages of the present invention will become more apparent from the following detailed description of presently preferred embodiments when taken in conjunction with the accompanying drawings wherein:

FIG. 1 shows a partial longitudinal sectional view through a cylinder head with an air-intake channel, with an evaporation element in accordance with the present invention located in the partition wall and projecting into the air-intake channel and with a fuel injection schematically indicated;

FIG. 2 is a partial longitudinal sectional view of the cylinder head with the evaporation element similar to FIG. 1 but terminating as part of and flush with the partition wall in the air-intake channel;

DETAILED DESCRIPTION OF THE DRAWINGS

Figure 3:
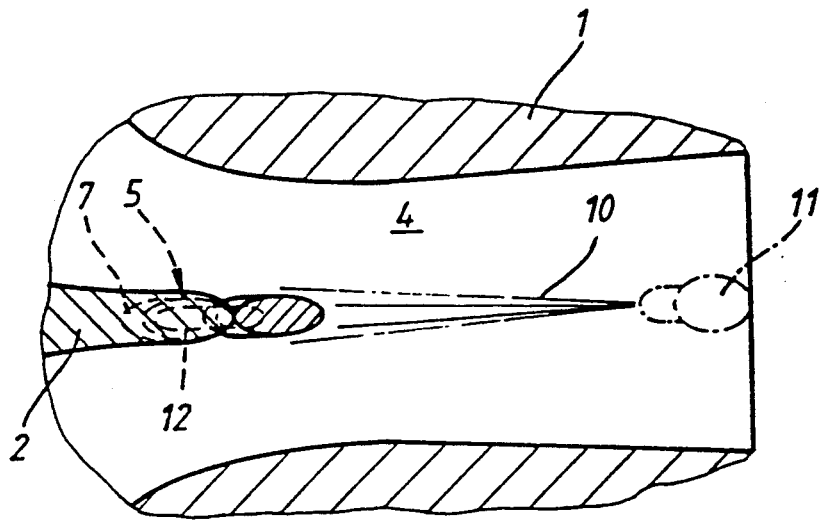
FIG. 3 is a cross-sectional view along line III—III of FIGS. 1.
Figure 4:
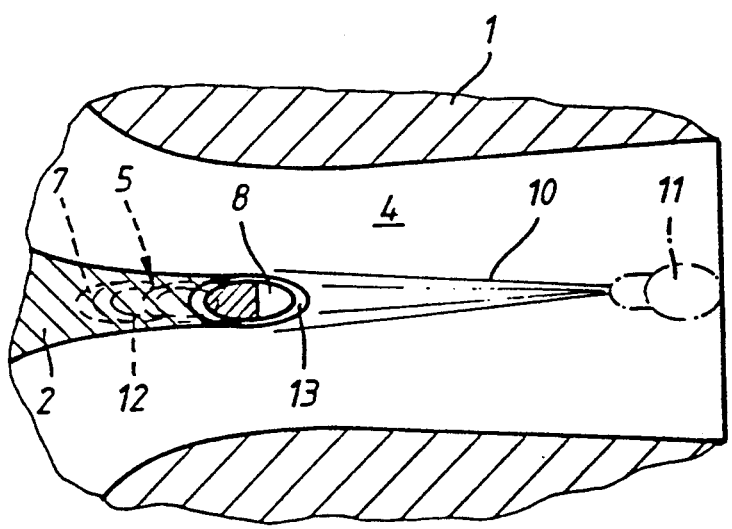
FIG. 4 is a cross-sectional view along line IV—IV of FIG. 2.

In a cylinder head 1 of a multi-valve engine shown in FIG. 1, a bar-shaped evaporation element 5 is cast or pressed into a partition wall 2 between two inlet-valve channels which lead away from a main combustion space 3 into an obliquely arranged air-intake channel 4. The evaporation element 5 is perpendicular to a wall 6 of the main combustion space and terminates flush there with an end 7 facing away from the air-intake channel 4. The evaporation element 5 passes through the partition wall 2 and projects into the air intake channel 4 in a free-standing manner with an end 8 facing the air-intake channel 4. The evaporation element 5 can have an oval cross-section, be equipped with a ribs 9 and be subjected to an injection jet 10 from a fuel-injection nozzle 11. In the partition wall 2, the evaporation element 5 has an annular clearance 12 for insulation purposes.

FIG. 2 shows the evaporation element 5 in the cylinder head 1 of FIG. 1, terminating flush with the contour of the partition wall 2 facing the air-intake channel 4. The terminating end 8, ribbed within the partition wall 2, of the evaporation element 5 forms with the surrounding partition wall an air-insulating gap 13.

The invention is, of course, not restricted only to multi-valve engines, but also includes engines with only one inlet valve per cylinder. In this case, the evaporation element 5 passes through the cylinder-head housing and, as described previously with regard to a multi-valve engine, projects with one end into the main combustion space and with the other into the individual air-intake channel.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An internal combustion engine cylinder head with two inlet valves, comprising at least one inlet valve and a fuel injector in an air-intake channel and an evaporation element configured to improve fuel/air mixture formation and projecting into the air-intake channel with one end thereof having ribbing, wherein the evaporation element is made of high thermal conductivity material, adjoins one end of a main combustion space of the internal-combustion engine and is arranged in a partition wall located between two inlet channels with an annular clearance between the partition wall and the evaporation element in order to insulate the partition wall.

2. The cylinder head according to claim 1, wherein the evaporation element has oval configuration.

3. The cylinder head according to claim 2, wherein the evaporation element is configured as a heat pipe.

4. The cylinder head according to one of claim 3, wherein the evaporation element terminates flush with the main combustion space at the end facing away from the air-intake channel.

5. The cylinder head according to claim 4, wherein the evaporation element terminates at an end flush with the contour of the partition wall facing the air-intake channel.

6. The cylinder head according to claim 5, wherein the evaporator element end forms an air-insulating gap with the surrounding partition wall.

* * * * *